Oct. 19, 1965      H. G. THOMPSON      3,212,587
                   REVERSIBLE DISC PLOW
Filed June 4, 1962                     7 Sheets-Sheet 1

INVENTOR.
HOWARD G. THOMPSON
BY
*Wolfe, Hubbard, Voit & Osann*
ATTORNEYS.

Oct. 19, 1965  H. G. THOMPSON  3,212,587
REVERSIBLE DISC PLOW
Filed June 4, 1962  7 Sheets-Sheet 5

INVENTOR.
HOWARD G. THOMPSON
BY
Wolfe, Hubbard, Voit & Osann
ATTORNEYS.

INVENTOR.
HOWARD G. THOMPSON
BY
Wolfe, Hubbard, Voit + Osann
ATTORNEYS.

United States Patent Office

3,212,587
Patented Oct. 19, 1965

3,212,587
REVERSIBLE DISC PLOW
Howard G. Thompson, Livonia, Mich., assignor to Massey-Ferguson Inc., Detroit, Mich., a corporation of Maryland
Filed June 4, 1962, Ser. No. 199,790
11 Claims. (Cl. 172—222)

This invention relates generally to agricultural plows and concerns, more particularly, a reversible disc plow intended for mounting on elevatable tractor hitch linkages.

An object of the invention is to provide an improved reversible plow having a frame construction that is exceptionally strong and rigid for a plow of this type while being quite light in weight. A related object is to provide a plow having a frame of the above character which moves easily through crop residue with little resistance from, or snagging of, the crop material.

Another object is to provide a plow of the type described above having a simplified frame and plow beam construction which avoids the need for a massive structure supporting a heavy shiftable plow beam.

It is also an object to provide a plow as referred to above having a reversing mechanism that uses the weight of the plow to develop a turning force and which can be selectively conditioned quite easily from the tractor seat for automatic reversal each time the plow is elevated by the hitch linkage. A collateral object is to provide an automatic reversal mechanism of the above type which can be simply adjusted to initiate plow reversal at any desired level of plow elevation. A more detailed object is to provide a novel latch for a reversal mechanism as characterized above which is simple and economical while being quite reliable and capable of heavy duty use.

It is a further object to provide a disc plow of the above referred to type in which the individual discs are, to a limited extent, self-positioning so that the desired reversal of the disc angle of attack is accomplished with a minimum amount of plow beam movement.

Other objects and advantages of the invention will become apparent upon reading the following detailed description and upon reference to the drawings, in which:

FIG. 2a is an enlarged section taken along line 2a—2a in FIG. 2;

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
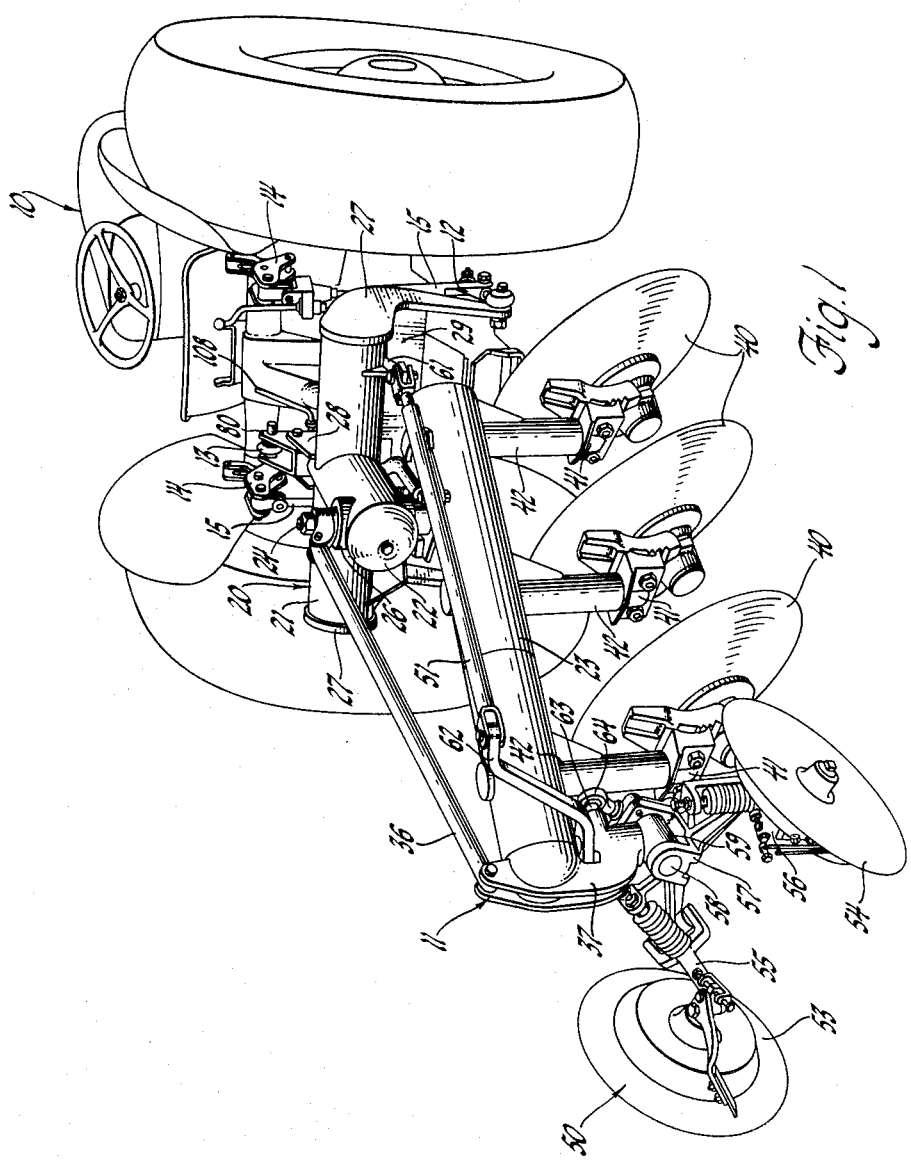
FIGURE 1 is a rear perspective of a tractor and implement assembly utilizing a plow embodying the present invention.

Turning first to FIG. 1, there is shown a tractor-implement assembly including a tractor 10 and a reversible disc plow 11 constructed in accordance with the invention. The tractor 10 is provided with the typical three-point hitch associated with the well known "Ferguson System" which includes a pair of trailing draft links 12 and a top link 13 (see also FIGS. 2 and 3). The tractor also includes a pair of lift arms 14 connected by drop links 15 to the draft links 12 so as to suspend, raise or lower the draft links and an implement, such as the plow 11, supported thereon. As will be well known to those familiar with this art, the lift arms 14 are connected to a power driven rockshaft which permits the operator of the tractor 10 to control the vertical position of the plow 11 that is mounted on the links 12, 13.

Pursuant to the invention, the plow 11 includes a T-shaped frame 20 formed of rigidly joined, tubular, cross and stub portions 21 and 22, respectively, which supports a laterally shiftable subframe in the form of a tubular plow beam 23 pivoted near its forward end on the stub portion 22 for swinging movement parallel to the plane of the T-shaped frame 20. In the preferred embodiment, the beam 23 carries an upstandnig column 24 that is fitted in bearings 25 mounted in a sleeve 26 rigidly secured in the frame stub portion 22 (see also FIG. 4). A pair of depending bracket plates 27 secured on opposite ends of the frame cross portion 21 provide attachment points for the draft links 12, and upstanding bracket plates 28 provide an attachment point for the top link 13.

A cross piece 29 is secured between the plates 27 to provide rigidity. At the same time the cross piece 29 provides a suitable hanger for accessory weights (not shown) which can be added to increase the weight of the plow.

Figure 5:
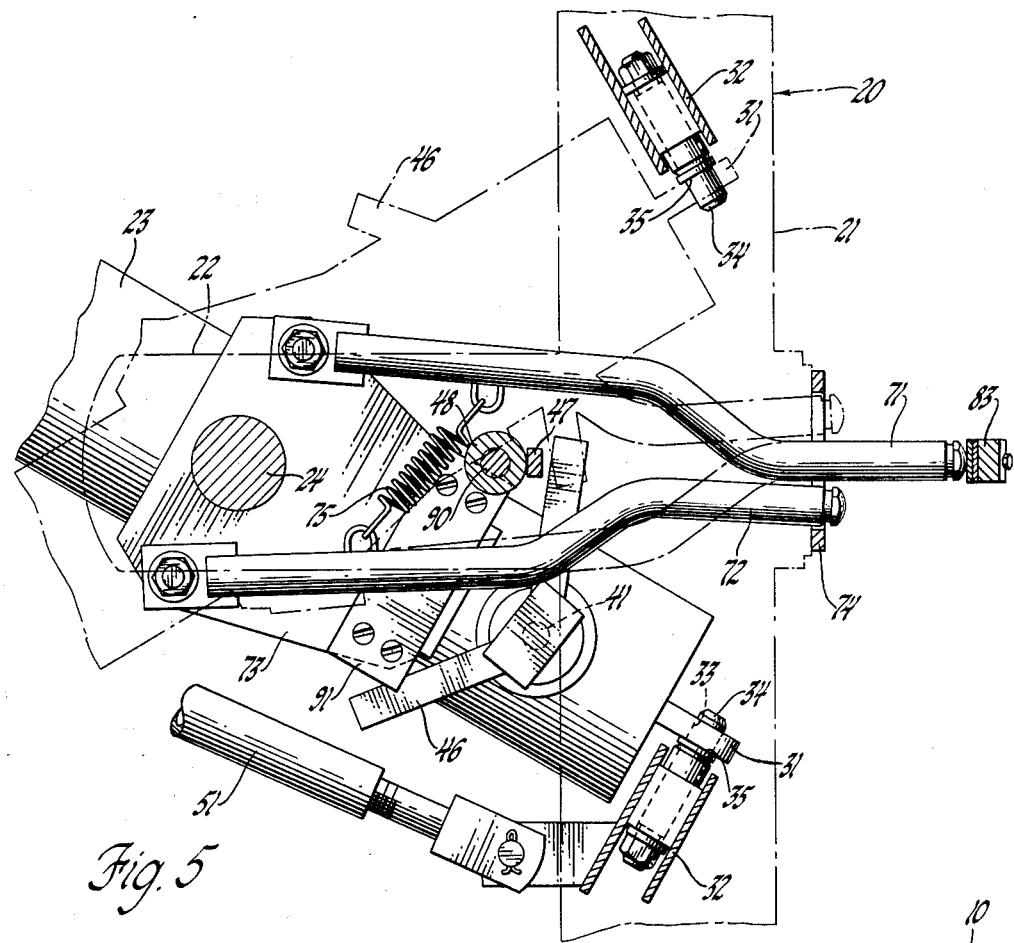
FIG. 5 is a fragmentary section taken approximately along the line 5—5 in FIG. 4.
Figure 6:
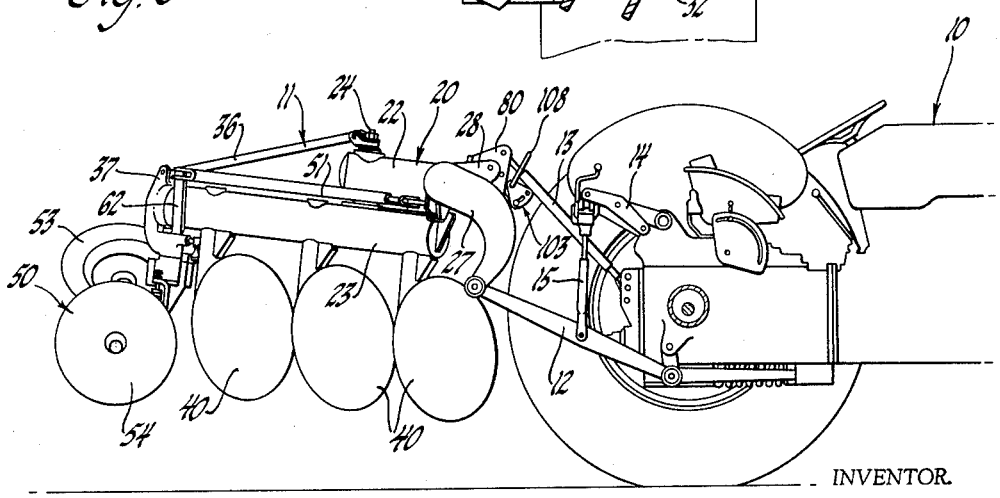
FIG. 6 is a reduced, fragmentary elevation of the tractor and implement assembly shown in FIG. 1 with the implement being shown in raised transport position.

The plow beam 23 swings laterally between limit positions defined by a stop 31 carried on the forward end of the beam and a pair of abutments 32 secured to the underside of the frame cross portion 21 (see FIG. 5). As a feature of the invention, the stop 31 and the abutments 32 have interfitting portions so as to rigidify the beam in its limit positions as well as establish those limit positions. In the illustrated construction, the stop 31 is formed with a circular aperture 33 adapted to fit over pins 34 forming portions of the abutments 32. The pins 34 are formed with shoulders 35 which positively limit swinging movement of the beam 23. With the stop hole 33 fitted over either one of the pins 34, a rigid connection is established between the forward end of the plow beam 23 and the plow frame 20 so as to minimize twisting loads on the column 24. The rear end of the beam 23 is supported by a strut 36 which extends from the upper end of the column 24 to an end member 37 forming the rear end portion of the beam 23.

The plow 11 is a disc plow and includes a plurality of disc plow elements 40 mounted along the beam 23 on shafts 41 supported for limited rotational movement in depending posts 42 fixed in the beam 23. Preferably, pins 43 are anchored in the posts 42 and pass through tapered slots 44 in the shafts 41 (see FIG. 2a). The ends of the slots 44 abut the pins 43 so as to establish limit positions for rotation of the shafts 41. The limited rotational movement permitted the shafts 41, allows the disc elements 40 to be cammed into their proper angles of attack upon engagement of the disc elements with the ground when the beam 23 is in either alternate position.

That is, with the beam 23 shifted from one alternate position to the other, the disc elements 40 are turned only partially toward their proper angle of attack, and as soon as the elements are lowered into contact with the ground, forward movement of the plow causes the ground to cam the disc elements to the full extent of their permitted rotational movement, with the result that the disc elemens swing into their proper angle of attack with respect to the direction of plow movement. Thus, the disc elements 40 are fully rotated as required to reverse their angle of attack with only a minimum amount of swinging movement of the plow beam 23.

Preferably, the forwardmost disc element 40 is positively positioned upon swinging movement of the beam 23 between its limit positions. For this purpose, a fork lever 46, secured to the upper portion of the shaft 41 on which the forwardmost disc element is mounted, is positioned to cooperate with a stop 47 that is secured to a collar 48 depending from the underside of the plow frame portion 22. As can be best seen in FIG. 5, swinging movement of the plow beam 23 from the dashed line position to the solid line illustrated position causes the fork lever 46 to strike the abutment 47 so as to rotate the shaft 41 clockwise, thus swinging the forwardmost disc element 40 into the proper angle of attack. Reverse movement of the beam 23 causes the lever 46 to again strike the abutment 47 and swing the forwardmost disc element 40 in the opposite direction.

In keeping with the invention, a furrow wheel assembly 50 is pivotally mounted at the rear end of the beam 23 for shifting movement about a vertical axis, and a link 51 is provided to maintain the assembly 50 at the proper angular relationship with respect to the plow frame 20 as the beam 23 shifts between its limit positions. In the illustrated embodiment, a pair of alternately usable furrow wheels 53 and 54 are journalled on knee action arms 55 and 56, respectively, which form portions of a laterally rockable subframe 57. The subframe is journalled on a shaft 58 carried in a steering knuckle element 59 so that the subframe can be tilted about a generally fore-and-aft axis to bring alternate ones of the furrow wheels 53, 54 into operating position. The steering knuckle element 59 is journalled in the beam end member 37 for rotation about a generally vertical axis. The link 51 extends from a bracket 61 fixed to the plow frame 20 to a crank arm 62 that is rigidly secured to the upper end of the member 59. It can thus be seen that the crank arm 62, and thus the furrow assembly 50, remains at substantially the same angular relationship with respect to the frame 20 as the beam 23 shifts from side to side between its limit positions. In effect, the angular disposition of the member 59 remains constant and the plow beam 23 rotates about the assembly 50 as it swings from side to side.

Figure 2:
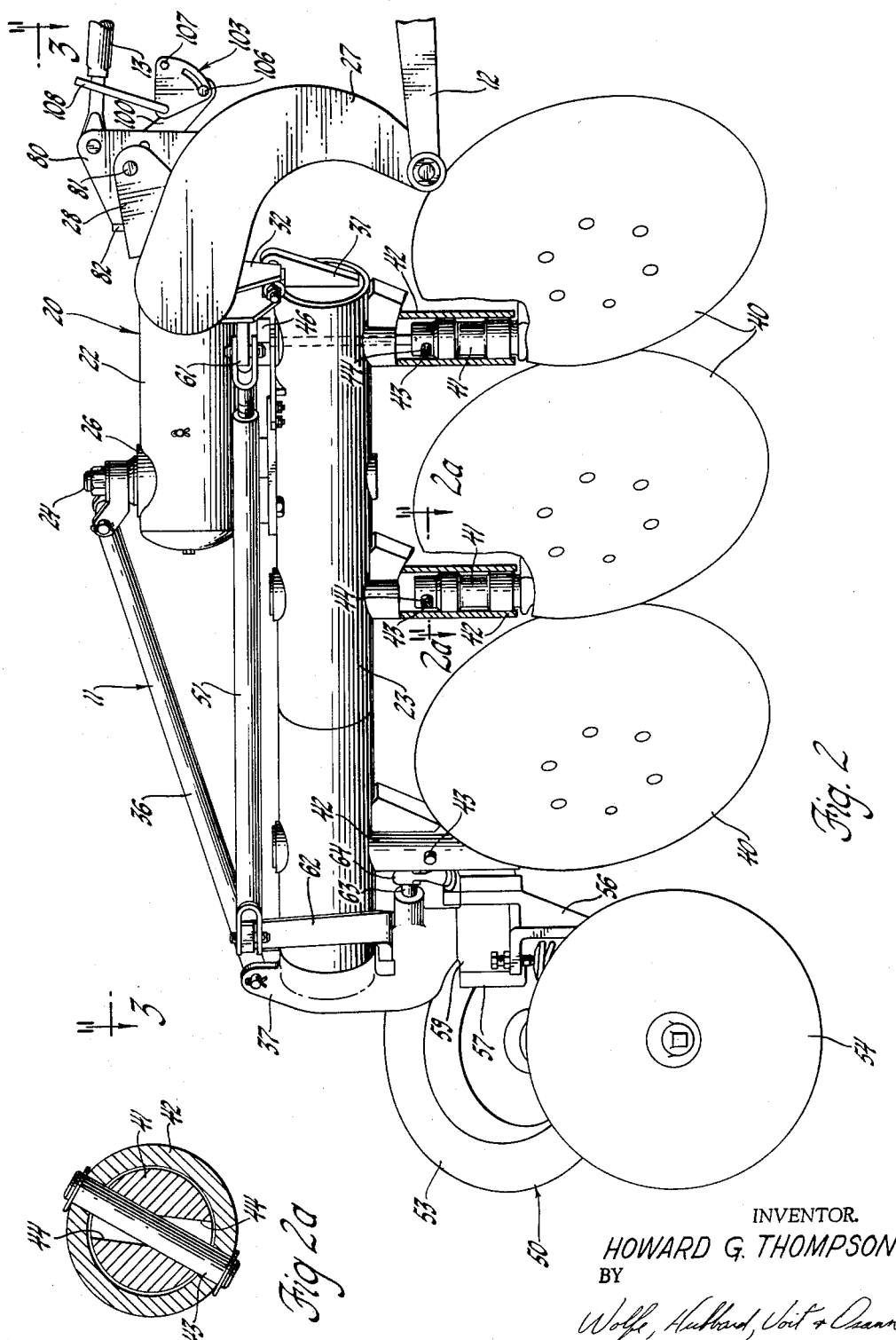
FIG. 2 is an enlarged side elevation of the plow shown in FIG. 1.
Figure 3:
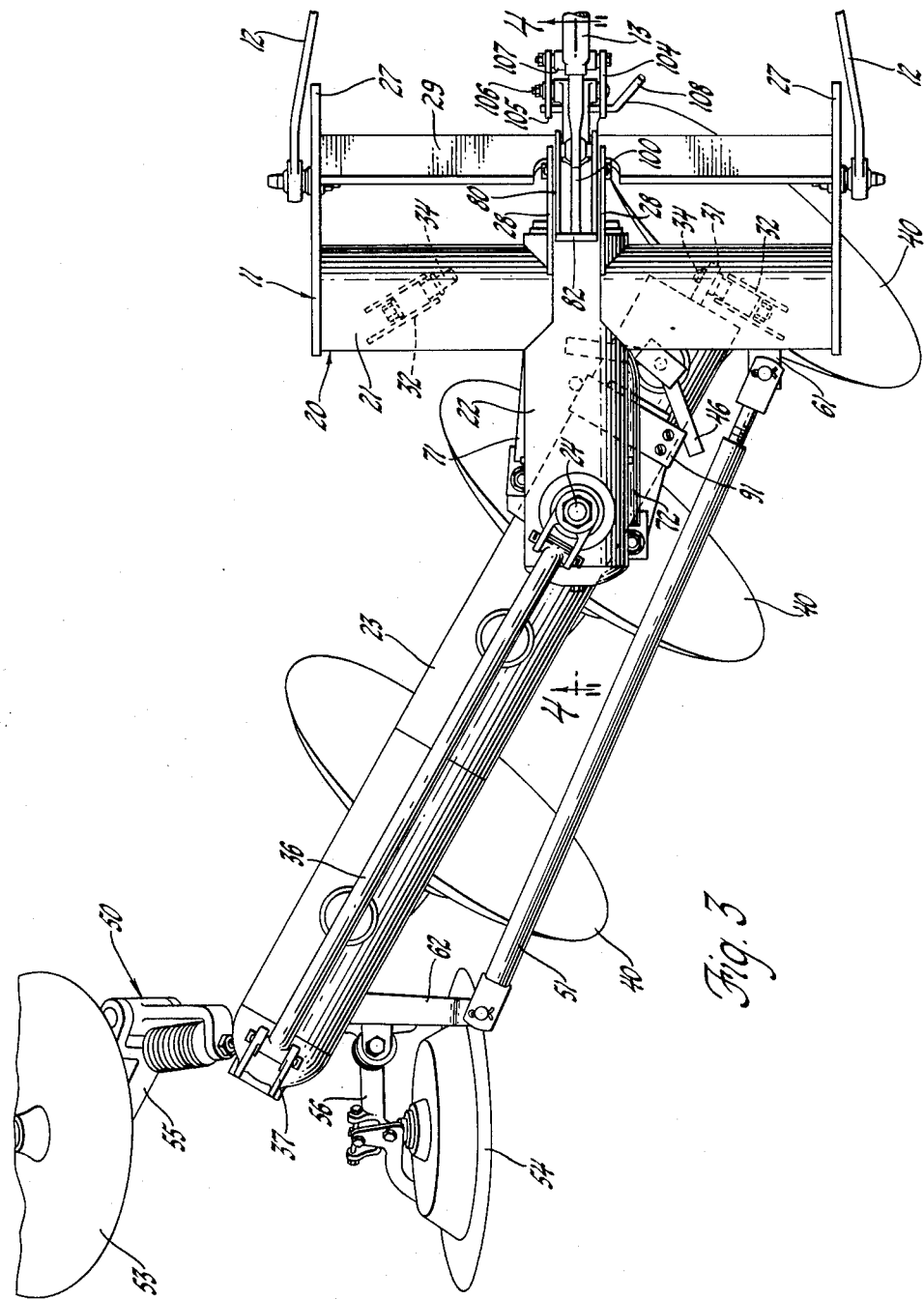
FIG. 3 is a fragmentary plan view taken approximately along the line 3—3 in FIG. 2.

To rock the proper furrow wheel into operating position, a crank connection is provided including a ball pin 63, secured to the forward portion of the beam end member 37, coupled for universal swinging movement to a crank lever 64 that is slidably mounted in the upper end of the rockable subframe 57. In operation, the pin 63 remains alined with the plow beam 23 as the latter swings between its alternate limit positions. Thus, with the beam 23 swung to the left as shown in FIGS. 1, 2 and 3, the pin 63 is disposed to the right of the shaft 58 on which the subframe 57 is rockably mounted. As a result, the crank lever is tilted to the right of the implement, and the furrow wheel 54 is lowered into operating position. Conversely, swinging the beam 23 to its alternate position so that it is disposed at the right of the implement center line causes the crank lever 64 to be tilted to the left, with the result that the subframe 57 is rocked so as to lift the furrow wheel 54 and swing the alternate furrow wheel 53 down into operating position. It can thus be seen that the furrow wheel assembly 50 is properly positioned incident to swinging movement of the beam 23.

In carrying out the invention, the plow 11 is reversed, i.e., shifted between its alternate operating positions, by the weight of the plow itself. Preferably, the shifting mechanism includes two pushrods 71 and 72 pivoted on opposite sides of a plate 73 secured to the upper portion of the beam 23 about the column 24. The ends of the rods 71, 72 slide in an apertured plate 74 depending from the plow frame 20. A helical spring 75 is tensioned between the rods 71, 72 so as to urge both rods together and toward alinement with the beam 23. As a result, with the beam 23 in its solid line FIG. 5 position, the spring 25 tends to swing both pushrods 71, 72 downwardly so that the pushrod 71 becomes centered with respect to the apertured plate 74 and extends forwardly of the plate. Upon swinging movement of the beam 23 to its alternate position, that shown in dashed lines in FIG. 5, the spring 75 again tries to aline the pushrods 71, 72 with the beam 23, with the result that the rod 71 abuts the upper side of the plate 74 and the rod 72 is centered and extends forwardly from the apertured plate.

The weight of the plow 10 acts on the shifting mechanism pushrods 71, 72 through a toggle plate 80 pivoted on the brackets 28 and pivotally receiving the top link 13 of the tractor hitch. Preferably, the toggle plate 80 is a bifurcated member journalled on a pin 81 between the plates 28 and provided with a cross piece 82 that abuts the frame stub portion 22 to limit rotation of the toggle plate in a counterclockwise direction (see FIGS. 2 and 4). The plate 80 carries a depending foot portion 83 which is adapted to engage whichever one of the pushrods 71, 72 is centered in the apertured plate 74.

Figure 4:
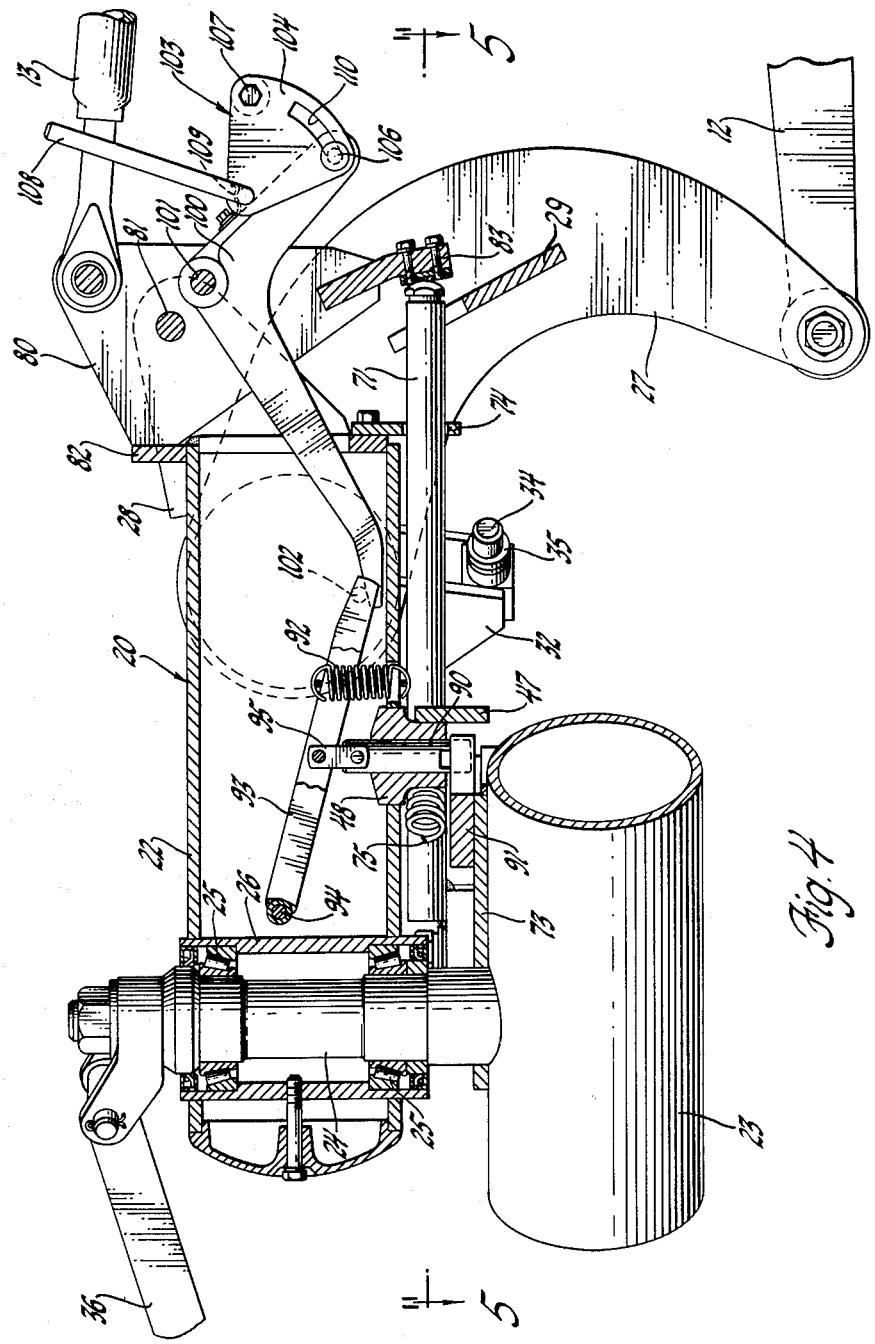
FIG. 4 is an enlarged fragmentary section taken approximately along the line 4—4 in FIG. 3.

When the plow 11 is elevated on the tractor hitch linkage, it will be seen that the weight of the plow tends to force the toggle plate 80 to rock in a clockwise direction as seen in FIG. 4 about the pin 81. If the plow beam 23 is free to rotate, the weight of the plow forces the toggle plate 80 to pivot about the pin 81 so as to drive the centered pushrod, the pushrod 71 in FIGS. 4 and 5, to the left with the result that the plow beam swings from the solid line position of FIG. 5 to the dashed line position shown in that figure. As the beam 23 rotates, the other pushrod 72 simply slides idly along the pushrod 71 and past the foot portion 83 of the toggle plate 80. When the plow is again lowered into contact with the ground, the toggle plate 80 swings in a counterclockwise, collapsing direction until the stop piece 82 abuts the plow frame 20, at which point the pushrod 72 is free to snap in front of the foot portion 83 under the urging of the spring 75 so as to condition the shifting mechanism for the next reversal in the opposite direction.

To hold the beam 23 in its alternate positions, a releasable latch is provided including a lock pin 90 slidably mounted in the collar 48 and adapted to engage opposite sides of a latch block 91 secured to the upper surface of the beam plate 73. A tensioned helical spring 92, acting through a lever 93 pivoted on a shaft 94 within the frame stub portion 22, urges the pin 90 downwardly into its latched position. A link 95 interconnects the lever 93 and the pin 90 to prevent binding of the pin as it slides up and down in the collar 48. It will be appreciated that with the pin 90 extending downwardly into abutment with one side of the latch lock 91, the beam 23 is locked against swinging movement. Thus, the plow 11 can be raised on the tractor hitch links 12, 13 and the force exerted by the toggle plate 80 against the rearwardly extending pushrod is resisted by the abutment of the latch pin 90 and the block 91. In effect then, the latch pin 90 blocks movement of the toggle plate 80.

As best seen in FIG. 5, the latch pin 90 abuts opposite sides of the latch block 91 so as to lock the beam 23 in both of its alternate operating positions.

In accordance with a further aspect of the invention, a latch trip lever 100 is arranged to be easily conditioned from the tractor driver's seat for "automatically" releasing the plow latch each time the plow is elevated on the tractor hitch linkage. The lever 100 is preferably L-shaped and is pivoted on a pin 101 fitted between the bifurcated portions of the toggle plate 80 so as to underlie the top link 13 of the tractor hitch. The rearwardly extending end of the trip lever 100 underlies a pin 102 fixed on the lever 93, and the opposite end of the trip lever carries a shiftable abutment member 103. In the illustrated construction, the abutment member 103 is formed by a pair of parallel, generally triangular plates 104 and 105 rigidly spaced by bars 106 and 107 (see FIG. 3).

The bar 106 is pivotally mounted in the end of the lever 100 so that the abutment member 103 is swingable between operative and inoperative positions. To control the position of the abutment member 103, a manual operator 108 is secured between the plates 104, 105 and provided with an upwardly extending handle portion. The operator 108 is adapted to snap beneath a detenting spring 109 secured to the upper surface of the trip lever 100 so as to releasably hold the abutment member 103 in its operative position as shown in solid lines in FIG. 7. To swing the abutment member 103 to its inoperative position, shown in dashed lines in FIG. 7, the tractor operator merely pulls the operator 108 forwardly free of the snap engaged, detenting spring 109 so as to rotate the abutment member 103 clockwise as seen in this figure with the bar 106 rotating in the end of the trip lever 100.

Figure 7:
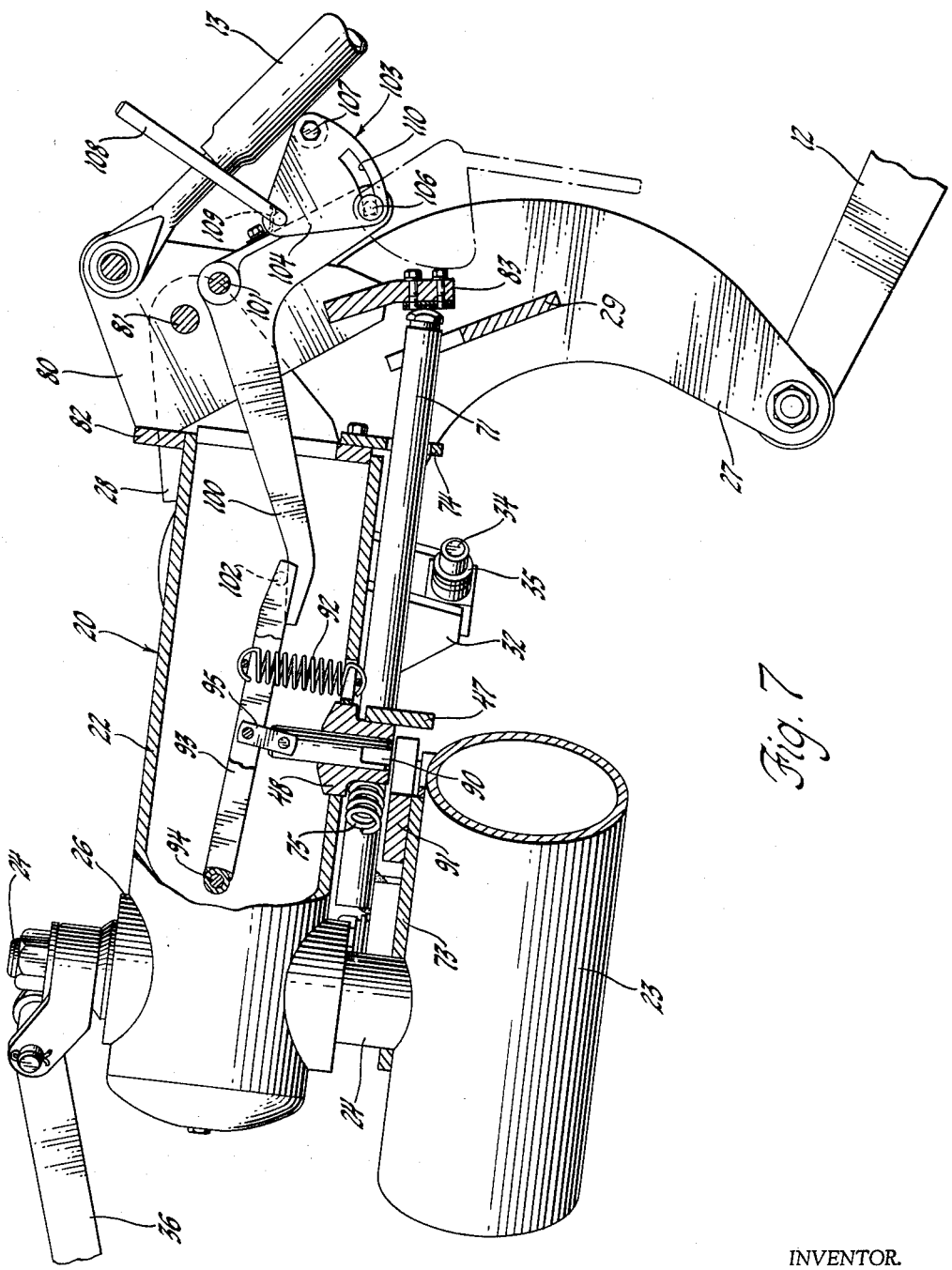
FIGS. 7 and 8 are fragmentary sections similar to FIG. 4 but showing portions of the plow mechanism in alternate positions of operation.
Figure 8:
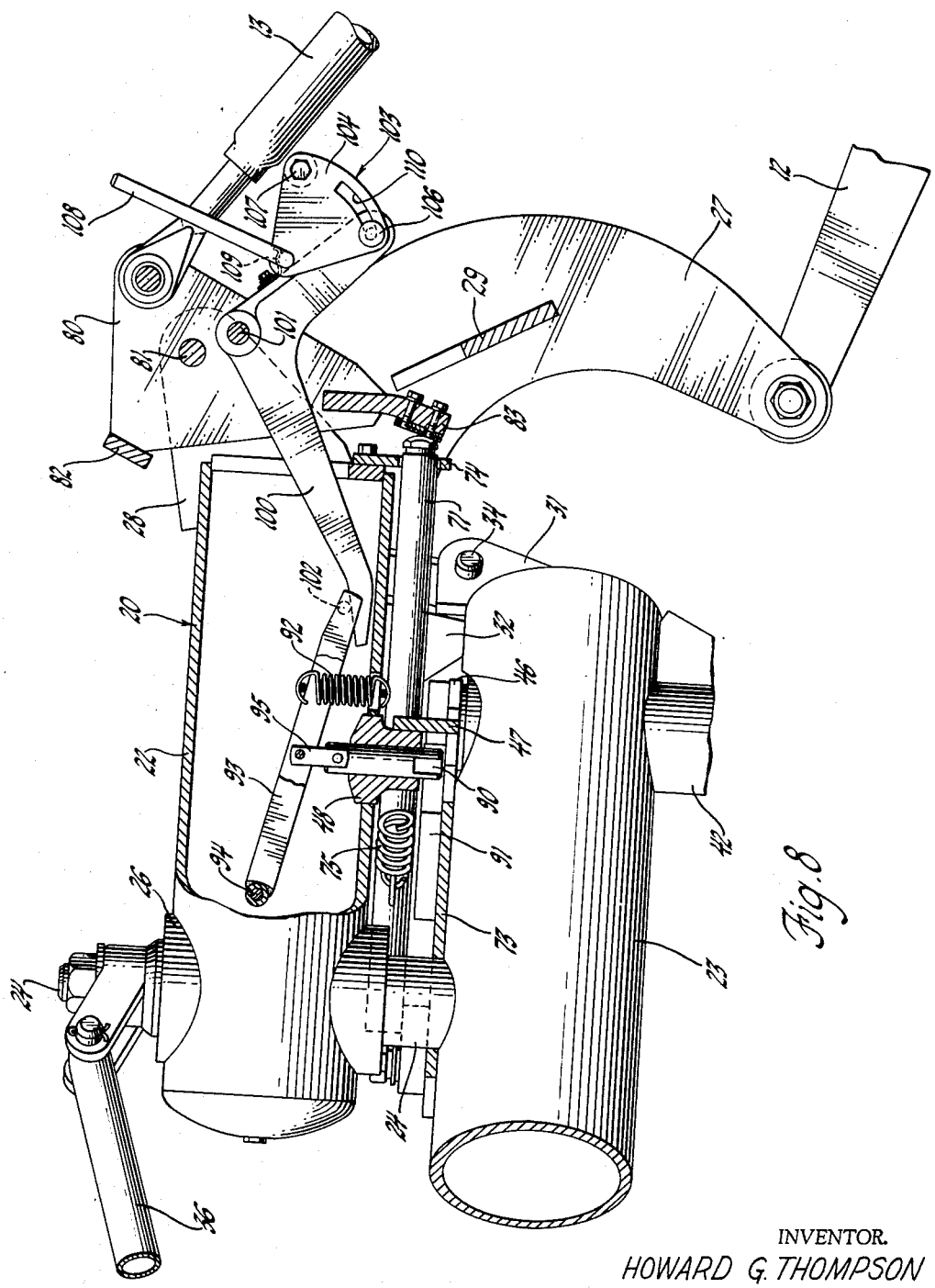

The operation of the latch tripping mechanism can perhaps be best seen by comparing FIGS. 4, 7 and 8. In FIG. 4, the parts are shown with the plow 11 in lowered operating position with the beam 23 swung to the left as viewed in the direction of plow movement. It will be noted that the bar 107 is well spaced beneath the upper hitch link 13.

Upon elevating the plow, the angle of the upper hitch link 13 with respect to the frame 20 inherently changes with the result that the abutment member bar 107 and the link 13 move into engagement, rocking the trip lever 100 clockwise to the position shown in FIG. 7. This lifts the lever 93 against the force of the spring 92 and pulls the latch pin 90 up into the collar 48 and clear of the latch block 91. The beam 23 is thus freed for swinging movement and the weight of the plow causes relative rotation of the toggle plate 80 about the pin 81 so as to drive the pushrod 71 toward the left and reverse the position of the plow beam 23 in the manner described above. This rocking movement of the toggle plate 80 carries the trip lever 100 slightly to the left as seen in FIGS. 7 and 8, so that the bar 107 clears the upper hitch link 13 with the result that the spring 92 is again able to pull the latch pin 90 downwardly into locking engagement against the opposite side of the latch block 91. This is the position of the parts shown in FIG. 8. The plow has thus been reversed and relatched without attention from the operator and simply as an incident to raising the plow on the elevatable tractor hitch linkage.

To adjust the elevated position at which the latch pin 90 is lifted to release the beam for reversal, the abutment member bar 106 is anchored to the abutment member plates 104, 105 in arcuate slots 110. Thus, by loosening and retightening the bar 106 at a selected position along the slots 110, the spacing of the bar 107 from the end of the trip lever 100 can be adjusted. It will be appreciated that this spacing controls the point at which the upper link 13 causes rotation of the trip lever 100 to lift the latch pin 90.

In summary, it will be understood by those skilled in the art that the frame construction of the reversible plow 11, consisting essentially of tubular elements, is exceptionally strong and rigid while being quite light in weight. The interaction of the strut 36 and the interlocking stop 31 and abutments 32 provides exceptional rigidity for the plow beam 23 in its operating positions without a massive, heavy frame construction. The tubular configuration of the plow frame 20 and the beam 23 permits the plow to move easily through crop residue with little resistance or snagging.

It will also be appreciated that the trip mechanism allows the tractor operator to have the plow 11 reversed automatically each time the plow is elevated on the tractor hitch linkage. Alternatively, the operator can easily, from the tractor seat, swing the manual operator 108 forwardly so as to disable the latch trip linkage with the result that the plow will remain, when elevated, in the position in which it is latched.

Because of the limited rotational movement permitted the plow disc elements 40, the desired change in the plow element angle of attack can be made with a minimum movement of the plow beam 23.

Finally, as those skilled in the art will appreciate, the plow 11 is of a simple, rugged construction so as to be well suited for commercial manufacture and heavy duty use.

I claim as my invention:

1. A reversible plow comprising, in combination, a T-shaped frame formed of rigidly joined tubular cross and stub portions, bracket plates mounted on said frame and providing attachment points for securing the plow on a tractor hitch linkage, a tubular plow beam pivoted near its forward end on said frame stub portion for swinging movement parallel to the plane of said T-shaped frame, a plurality of posts depending from said plow beam, plow elements mounted on said posts, a strut connecting the extending end of said plow beam and said frame at the pivot axis of the beam, and a stop on said beam for establishing limits to the swinging movement of said beam.

2. A reversible plow comprising, in combination, a T-shaped frame formed of rigidly joined tubular cross and stub portions, bracket plates mounted on said frame and providing attachment points for securing the plow on a tractor hitch linkage, a tubular plow beam pivoted near its forward end on said frame stub portion for swinging movement parallel to the plane of said T-shaped frame, a plurality of posts depending from said plow beam, plow elements mounted on said posts, a strut connecting the extending end of said plow beam and said frame at the pivot axis of the beam, a stop on the forward end of said beam, and a pair of abutments on said frame, said stop and said abutments having interfitting portions for both establishing limits to the swinging movement of said beam and interlocking said forward end of the beam with said frame to rigidify the beam in its alternate limit positions.

3. A reversible plow comprising, in combination, a T-shaped frame formed of rigidly joined tubular cross and stub portions, bracket plates mounted on said frame and providing attachment points for securing the plow on a tractor hitch linkage, a tubular plow beam pivoted on said frame stub portion for swinging movement parallel to the plane of said T-shaped frame, a plurality of posts depending from said plow beam, plow elements mounted on said post, a shifting mechanism for swinging said beam from side to side between alternate limit positions, a furrow wheel assembly pivotally mounted at the rear end of said beam for shifting movement about a vertical axis, a link coupling said frame cross member and said furrow wheel assembly so as to hold the assembly at a fixed angular relationship with respect to the frame as said beam shifts between said limit positions, said assembly having a laterally rockable subframe supporting alternately operable furrow wheels, and a crank connection between said subframe and said beam for tilting alternate ones of said wheels into operating position upon shifting movement of said beam into said limit positions.

4. A reversible plow comprising, in combination, a T-shaped frame formed of rigidly joined tubular cross and stub portions, bracket plates mounted on said frame and providing attachment points for securing the plow on a tractor hitch linkage, a tubular plow beam pivoted near its forward end on said frame stub portion for swinging movement parallel to the plane of said T-shaped frame, a shifting mechanism for swinging said beam from side to side between alternate limit positions, a plurality of posts depending from said plow beam, a plurality of shafts each mounted for limited rotational movement in respective ones of said posts, and a plurality of disc plow elements each mounted on a respective one of said shafts so that the plow elements are free to be cammed into their proper angles of attack upon engagement of the disc elements with the ground with said beam in either one of its alternate limit positions.

5. A reversible plow comprising, in combination, a T-shaped frame formed of rigidly joined tubular cross and stub portions, bracket plates mounted on said frame and providing attachment points for securing the plow on a tractor hitch linkage, a tubular plow beam pivoted near its forward end on said frame stub portion for swinging movement parallel to the plane of said T-shaped frame, a shifting mechanism for swinging said beam from side to side between alternate limit positions, a post depending from said plow beam, a shaft mounted for limited rotational movement in said post, a plow element mounted on said shaft so as to be swingable into proper alternate angles of attack with said beam in either one of its alternate limit positions, a lever secured to said shaft, and an abutment on said frame cooperating with said lever to swing the shaft and the plow element to its proper angle of attack upon swinging movement of said beam into its alternate limit positions.

6. A reversible plow comprising, in combination, a frame having a pair of depending bracket plates providing attachment points for securing the plow to the draft links of a tractor hitch, a plow beam pivoted on said frame for side to side swinging movement, a toggle plate pivoted on said frame and providing an attachment point for securing the plow to the upper link of a three-point hitch, a shifting mechanism for swinging said beam from side to side between alternate limit positions, a latch for locking said beam in said limit positions, said mechanism being actuated by pivotal movement of said toggle plate relative to said frame, and means for releasing said latch upon elevation of the plow on said tractor hitch so that the beam is free to be swung by said mechanism as the weight of the plow forces said toggle plate to pivot relative to said frame.

7. A reversible plow comprising, in combination, a T-shaped frame formed of rigidly joined tubular cross and stub portions, a pair of depending bracket plates secured respectively on opposite ends of said frame cross portion and providing attachment points for securing the plow to the draft links of a tractor hitch, a tubular plow beam pivoted near its forward end on said frame stub portion for swinging movement parallel to the plane of said T-shaped frame, a toggle plate pivoted on said frame and providing an attachment point for securing the plow to the upper link of a three-point hitch, a shifting mechanism for swinging said beam from side to side between alternate limit positions, a latch for locking said beam in said limit positions, said mechanism being actuated by pivotal movement of said toggle plate relative to said frame, and means for releasing said latch upon elevation of the plow on said tractor hitch so that the beam is free to be swung by said mechanism as the weight of the plow forces said toggle plate to pivot relative to said frame.

8. A tractor-implement assembly comprising, in combination, a pair of trailing draft links and a top link secured to said tractor, means on said tractor for suspending, raising and lowering said links, said implement having a frame pivotally secured on the trailing ends of said draft links, a laterally shiftable subframe mounted on said frame, a mechanism on said frame for shifting said subframe between alternate limit positions, a toggle plate interconecting said top link and said frame so that the weight of the implement when supported on said links tends to rotate the plate, said plate being effective to drive said mechanism when rotated, a latch interconnecting said frame and subframe for releasably locking the subframe in its alternate limit positions, a lever pivotally supported on said frame for releasing said latch upon locking of the lever, an abutment member shiftably mounted on said lever and having an operative position wherein said top link is engaged to rock the lever and release said latch as the implement is raised, and a manual operator for shifting said member from said operative position to an inoperative position wherein the implement can be raised without releasing said latch.

9. A tractor-implement assembly comprising, in combination, a pair of trailing draft links and a top link secured to said tractor, means on said tractor for suspending, raising and lowering said links, said implement having a frame pivotally secured on the trailing ends of said draft links, a laterally shiftable subframe mounted on said frame, a mechanism on said frame for shifting said subframe between alternate limit positions, a toggle plate interconnecting said top link and said frame so that the weight of the implement when supported on said links tends to rotate the plate, said plate being effective to drive said mechanism when rotated, a latch interconnecting said frame and subframe for releasably locking the subframe in its alternate limit positions, a lever pivotally supported on said toggle plate for releasing said latch upon locking of the lever, and an abutment member mounted on said lever to engage said top link and rock the lever and release said latch as the implement is raised, said abutment lever being pulled away from said top link upon rotation of said toggle plate so as to relatch said plate upon shifting of said subframe.

10. A tractor-implement assembly comprising, in combination, a pair of trailing draft links and a top link secured to said tractor, means on said tractor for suspending, raising and lowering said links, said implement having a frame pivotally secured on the trailing ends of said draft links, a laterally shiftable subframe mounted on said frame, a mechanism on said frame for shifting said subframe between alternate limit positions, a toggle plate interconnecting said top link and said frame so that the weight of the implement when supported on said links tends to rotate the plate, said plate being effective to drive said mechanism when rotated, a latch interconnecting said frame and subframe for releasably locking the subframe in its alternate limit positions, a lever pivotally supported on said frame for releasing said latch upon locking of the lever, an abutment member shiftably mounted on said lever and having an operative position wherein said top link is engaged to rock the lever and release said latch as the implement is raised, a manual operator for shifting said member from said operative position to an inoperative position wherein the implement can be raised without releasing said latch, and means for adjusting the operative position of said member on said lever so as to control the implement elevation point at which said latch is released.

11. A reversible plow comprising, in combination, a frame having means for connecting the plow in draft relationship to a tractor, a plow beam pivoted on said frame for side to side swinging movement, a plurality of posts depending from said plow beam, a plurality of shafts with one shaft depending from each of said posts, each shaft being mounted in its respective post for rotational movement about a substantially vertical axis independently of the other shafts, a plurality of disc plow elements with one element mounted on each of said shafts, a shifting mechanism for swinging said beam from side to side between alternate limit positions to partially reverse the angles of attack of said elements, and means for limiting the independent rotation of said shafts to stop and hold the disc elements at their proper angles of attack when the elements engage the ground with the beam in either of said limit positions.

References Cited by the Examiner

UNITED STATES PATENTS

| | | | |
|---|---|---|---|
| 96,575 | 11/69 | Furst | 172—602 |
| 773,609 | 11/04 | Wagner | 172—574 |
| 2,163,832 | 6/39 | Coviello | 172—222 X |
| 2,672,801 | 3/54 | Barrett | 172—212 |
| 2,732,781 | 1/56 | Coviello | 172—212 |
| 2,780,158 | 2/57 | Pursche | 172—222 |
| 2,949,161 | 8/60 | Campbell | 172—212 |

ABRAHAM G. STONE, *Primary Examiner.*

CARL W. ROBINSON, T. GRAHAM CRAVER,
*Examiners.*